US012579833B2

(12) United States Patent
Mittal et al.

(10) Patent No.: US 12,579,833 B2
(45) Date of Patent: Mar. 17, 2026

(54) IDENTITY DOCUMENT DETECTION WITH CONVOLUTIONAL NEURAL NETWORKS FOR DATA LOSS PREVENTION

(71) Applicant: Palo Alto Networks, Inc., Santa Clara, CA (US)

(72) Inventors: Anirudh Mittal, Fremont, CA (US); Jesse Mie Kim, Palo Alto, CA (US); Suryakanth Kadahalli Puttaswamygowda, San Jose, CA (US); Manan Shah, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 208 days.

(21) Appl. No.: 18/346,953

(22) Filed: Jul. 5, 2023

(65) Prior Publication Data

US 2025/0014380 A1     Jan. 9, 2025

(51) Int. Cl.
| | |
|---|---|
| *G06V 30/413* | (2022.01) |
| *G06V 10/82* | (2022.01) |
| *G06V 30/10* | (2022.01) |
| *G06V 30/19* | (2022.01) |

(52) U.S. Cl.
CPC ............ *G06V 30/413* (2022.01); *G06V 10/82* (2022.01); *G06V 30/10* (2022.01); *G06V 30/19147* (2022.01)

(58) Field of Classification Search
CPC ...... G06F 21/60; G06F 21/64; G06F 21/6245; G06N 3/02; G06V 30/10; G06V 30/413; G06V 30/19147; G06V 10/82
See application file for complete search history.

(56) References Cited

U.S. PATENT DOCUMENTS

| | | | | |
|---|---|---|---|---|
| 8,799,287 B1 * | 8/2014 | Barile | ................... | G06F 16/353 |
| | | | | 707/738 |
| 9,043,247 B1 * | 5/2015 | Hart | ....................... | G06V 30/40 |
| | | | | 706/12 |
| 9,940,452 B2 * | 4/2018 | Chen | ....................... | H04L 63/08 |
| 10,990,856 B1 * | 4/2021 | Yang | ..................... | G06N 3/084 |
| 11,475,158 B1 * | 10/2022 | Zhang | ................... | G06V 10/82 |

OTHER PUBLICATIONS

Guha, et al. (A deep learning model for information loss prevention from multi-page digital documents). (Year: 2021).*
Ghouse, et al. (Data leakage prevention for data in transit using artificial intelligence and encryption techniques). (Year: 2020).*

* cited by examiner

*Primary Examiner* — Daniel G Mariam
(74) *Attorney, Agent, or Firm* — Gilliam IP PLLC

(57)     ABSTRACT

An identity document detector comprising a two-dimensional convolutional neural network is trained to detect categories of identity documents based on inputting unprocessed image data from documents. The documents comprise documents monitored by a data loss prevention (DLP) system across an organization, and each category of identity documents has associated risk levels for DLP. The DLP system performs corrective action to prevent data leakage based on detection of identity documents by the trained identity document detector and risk associated with the detected identity document categories as well as document context within the organization.

20 Claims, 6 Drawing Sheets

IDENTITY DOCUMENT DETECTION WITH CONVOLUTIONAL NEURAL NETWORKS FOR DATA LOSS PREVENTION

BACKGROUND

The disclosure generally relates to data processing (e.g., CPC class G06F) and to classification (e.g., CPC subclass G06F 16/35).

Data loss prevention (DLP) refers to a system's ability to identify, monitor, and protect data in use, data in motion, and data at rest. Data loss is the loss of control of confidential or sensitive data ("data leakage") and/or the compromise of integrity or availability of data. The different states of data (i.e., data at rest, data in-motion or in-transit, and data at the endpoint) have different vectors of data loss. The ability to monitor and protect data in motion can also be referred to as data leakage prevention. Data leakage prevention can employ exact data matching to enforce a security policy that includes a rule or provision for data leakage prevention. As implied by the name, a system enforces a data leakage prevention rule with exact data matching by determining whether data in motion includes data exactly matching an entry in a protected dataset.

BRIEF DESCRIPTION OF THE DRAWINGS

Embodiments of the disclosure may be better understood by referencing the accompanying drawings.

DESCRIPTION

Figure 1:
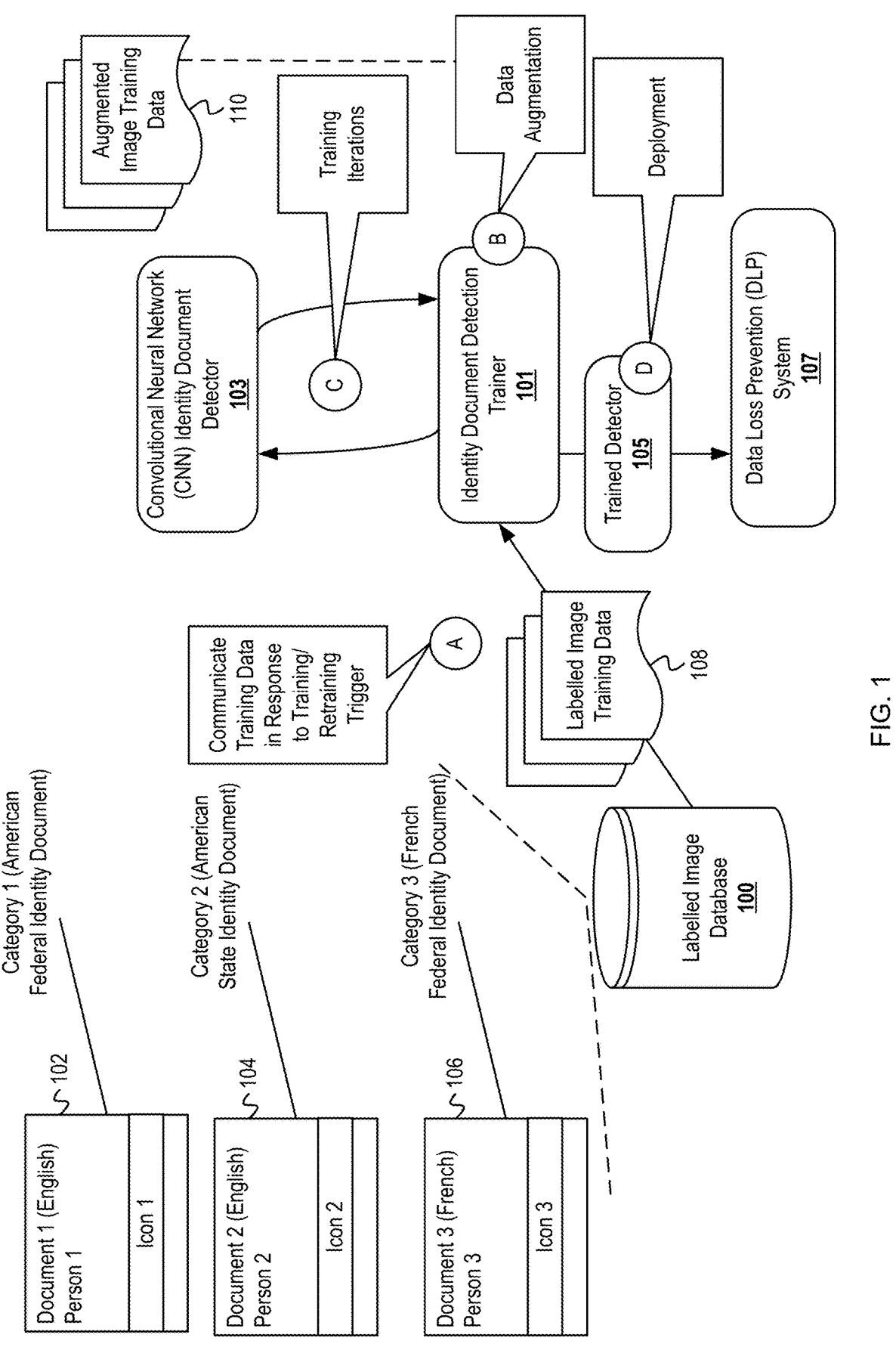
FIG. 1 is a schematic diagram of an example system for training an identity document detector for detecting categories of documents for data loss prevention.

The description that follows includes example systems, methods, techniques, and program flows to aid in understanding the disclosure and not to limit claim scope. Well-known instruction instances, protocols, structures, and techniques have not been shown in detail for conciseness.

Terminology

A "document" as used herein refers to a file with a data format that specifies type and location of data in the file. Documents comprise documents with image file formats that describe how to extract image data from documents. The image data comprises data formatted such that systems are able to process and render the corresponding image from the image data. Various file formats include image data stored in documents with compression algorithms, and the systems apply corresponding decompression algorithms to extract the image data.

An "identity document" as used herein refers to a document that comprises text data including personally identifiable information that may be used to prove an individual's identity. Identity documents vary with respect to formats, icons/other image artifacts, language of text data, and type of personal data contained therein. Identity documents can be issued by various government agencies and the languages contained in text data of an identity document vary based on geographic location of the issuing agencies.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Typical optical character recognition (OCR) techniques for DLP on image data contained in documents rely on applying OCR to extract text data from the image data and comparing the text data against regular expressions to determine whether potentially sensitive data is present. This involves storing the text data in memory, which represents an additional attack vector for data leakage. Additionally, regular expressions can fail when OCR incorrectly detects characters and/or parses cropped documents, rearranged documents, blurred documents, etc. Oftentimes, certain categories of documents (e.g., financial documents, identity documents, etc.) have a high probability of corresponding to sensitive data. Methods that detect features of an image (e.g., visual indicators such as icons, banners, etc.) as opposed to text can thus identify these categories of images and represent improvement over OCR in this context. Image detection machine learning models such as convolutional neural networks (CNNs) are known to be effective for feature recognition of spatial features such as those described above and detect aspects of image data beyond text.

A machine learning model identity document detector ("detector") disclosed herein is trained on augmented image data labelled with various categories that correspond to sensitive data including a "low confidence" category and a generic category that corresponds to an "other", "non-sensitive". The augmented image data is augmented via image-based transformations such as contrast, rotation, padding, skew, cropping, etc. The detector has an architecture that is conducive to detecting general image features as opposed to OCR that specifically detects characters. For instance, the detector can comprise a two-dimensional CNN. Once trained, the detector is deployed in a DLP system that detects and extracts image data from various data sources and inputs the unprocessed image data for documents into the trained detector. The trained detector outputs categories for each document corresponding to image data, and the DLP system flags documents corresponding to potentially sensitive categories for corrective action. The DLP system forwards documents corresponding to "other" or "non-sensitive" categories to other DLP components for further DLP analysis. The detector allows for triage of potentially sensitive data in documents while avoiding the pitfalls of OCR with regular expression matching and avoiding storage of potentially sensitive data during OCR.

Example Illustrations

FIG. 1 is a schematic diagram of an example system for training an identity document detector for detecting categories of documents for data loss prevention. FIG. 1 is annotated with a series of letters A-D. Each stage represents one or more operations. Although these stages are ordered for this example, the stages illustrate one example to aid in understanding this disclosure and should not be used to limit the claims. Subject matter falling within the scope of the claims can vary from what is illustrated.

At stage A, a labelled image database 100 communicates labelled image training data 108 comprising image data and corresponding category labels to an identity document detection trainer ("trainer") 101. The labelled image database 100 stores image data that resembles sensitive data for data loss prevention such as identity documents, financial documents, health care documents, etc. that comprise falsified or outdated information therein as well as non-sensitive image data such as publicly available images on the Internet. Example image data 102, 104, and 106 comprise documents labelled "Document 1" in English, "Document 2" in English, and "Document 3" in French, respectively, data including "Person 1", "Person 2", and "Person 3", respectively, and visual features labelled "Icon 1", "Icon 2", and "Icon 3", respectively. Note that image data 102, 104, and 106 are renderings of image data rather than the data itself for illustrative purposes and that the components in FIG. 1 do not necessarily render image data. Image data 102, 104, and 106 are labelled as category 1 corresponding to an American federal identity document, category 2 corresponding to an American state identity document (which can, in embodiments, corresponding to a particular state), and category 3 corresponding to a French federal identity document, respectively. Other visual features besides icons comprise banners, blurriness, brightness-based features, watermarks, jagged edges, etc.

In response to a trigger or query by an entity managing training of identity document detectors (e.g., the trainer 101), the labelled image database 100 communicates the labelled image training data 108 to the trainer 101 in response to a trigger for training/retraining, for instance based on a DLP system 107 detecting that no identity document detection model is deployed for a particular scope (e.g., an organization or network), that a threshold amount of time subsequent to previous training has occurred, that a sufficient amount of training data prior to augmentation has been collected by the labelled image database, etc. While not depicted in FIG. 1, an organization or administration can provide additional image training data to supplement the labelled image training data 108, for instance to further train an identity document detection model within the context of the organization to refine predictions.

At stage B, the trainer 101 augments the labelled image training data 108. Example data transformations for augmenting image data comprise contrast transformations, saturation transformations, brightness transformations, sharpness transformations, rotation transformations, noise transformations, skew transformations, white padding transformations, black padding transformations, and cropping transformations. White and black padding transformations comprise adding white and black pixels, respectively, to the outside of image data. Each data transformation can be applied multiple times to each labelled image data in the labelled image training data 108. For instance, multiple rotation angles can be applied, multiple types of Gaussian noise with variable variance can be applied, multiple magnitudes of contrast, saturation, brightness, and sharpness can be applied, multiple numbers of black and white pixels can be applied, and image data can be cropped at the side, center, and bottom with variable sizes. Each of these transformations represents potential transformations in real world image data for identity documents, for instance due to cut off/rotated scans, brightness from photo flashes, padding from variable image formats/sizes, etc. Parameters for each transformation can be chosen randomly. Each image data transformation is assigned an identical category label as the document corresponding to the image data that was transformed. The resulting augmented image training data 110 can be 10-100 times as large as the labelled image training data 108.

At stage C, the trainer 101 trains a CNN identity document detector ("detector") 103 to detect various categories of identity documents and "other" or "non-sensitive" document categories from unprocessed image data. Training depends on the type of machine learning model implemented for the detector 103 as well as other specified parameters and/or hyperparameters. For a CNN as depicted in FIG. 1, the trainer 101 splits non-augmented image data (i.e., prior to applying transformations) in the augmented image training data 110 into training, testing, and validation data and trains the detector 103 on the augmented image training data in various epochs and batches within each epoch with batches randomly sampled (e.g., uniformly at random) at a fixed ratio (e.g., 10%) from the training data until training criteria are satisfied. The training criteria can comprise that a threshold of epochs has elapsed, that internal parameters of the CNN are converging, that training/testing/validation errors are sufficiently low, etc. Other image recognition models such as ensemble architectures and recurrent neural network architectures can be alternatively implemented.

At stage D, the trainer 101 communicates the trained detector 105 to the DLP system 107 for identity document detection within a DLP monitoring/detection/corrective action pipeline. The DLP system 107 deploys the trained detector 105 according to the context for which it was trained, for instance at firewalls and/or agents deployed at a corresponding organization/network. The trained detector 105 can be deployed inline (e.g., at a firewall logging network traffic in the cloud) or offline (e.g., at a firewall monitoring at-rest data in a server according to a fixed schedule). Various versions of the trained detector 105 with varying internal architectures and amounts of training data used for training can be deployed in various contexts of the DLP system 107. For instance, trained detectors with lightweight architectures can be deployed inline, whereas trained detectors with heavyweight architectures can be deployed offline. Moreover, training data in the augmented image training data 110 can vary by context, for instance by including previous labelled images detected in the context for which the trained detector 105 is deployed. Once deployed, the DLP system 107 can update each instance of the trained detector 105 as additional training data is collected.

Figure 2:
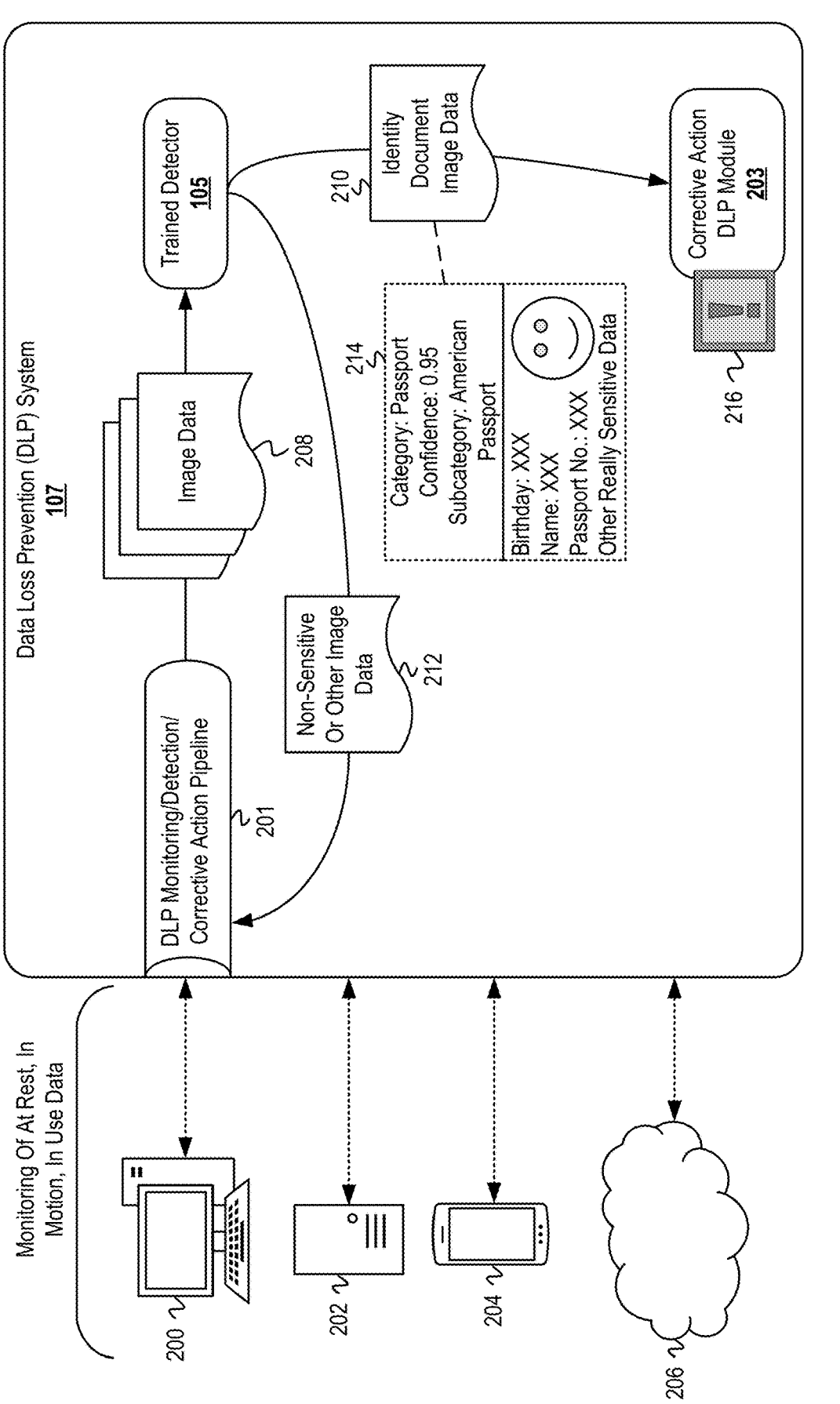
FIG. 2 is a schematic diagram of an example system for detecting identity document image data with a trained detector within a DLP pipeline.

FIG. 2 is a schematic diagram of an example system for detecting identity document image data with a trained detector within a DLP pipeline. The DLP system 107 monitors at rest, in motion, and in use data across an organization, network, or other context for which DLP is being monitored. For instance, as depicted in this example, the DLP system 107 can monitor data at a personal computer 200, at a server 202, at a smart phone 204, and in a cloud 206. The DLP system 107 can be deployed to various monitoring components through an organization, for instance to agents running at endpoints/servers, on Internet of Things (IoT) devices, at firewalls monitoring device traffic in the cloud, etc. DLP monitoring can occur inline for fast detection of potentially sensitive data or offline depending on relative risk of corresponding entities being monitored. Accordingly, the DLP system 107 can deploy the trained detector 105 variably at multiple endpoint devices, servers, firewalls, etc. Each deployed instance of the trained detector 105 was trained on training data catered to the context for which it was deployed, e.g., training data augmented with image data collected at the corresponding entities for which the trained detector 105 is deployed.

A DLP monitoring/detection/corrective action pipeline ("pipeline") 201 monitors at rest, in motion, and in use data to detect potentially sensitive data leaks and perform corrective action thereof. For instance, the pipeline 201 can comprise agents deployed on endpoint devices/servers, firewalls, etc. The pipeline 201 comprises data parsers and detection models trained to detect various types of potentially sensitive data such as financial data, medical data, personal data, etc. The pipeline 201 can be deployed at multiple instances (e.g., firewalls, endpoints, servers) across an organization or other entity being monitored and can be running inline or offline. Accordingly, the detection models can be lightweight (e.g., low numbers of internal parameters) and can take low latency data such as packet logs as inputs for efficient inline detection of potentially sensitive data.

When the pipeline 201 detects image data 208 corresponding to various documents in monitored data for DLP, the pipeline 201 forwards the image data 208 to the trained detector 105. The pipeline 201 can additionally forward the image data to other detection models, for instance distinct invocations of the trained detector 105 that are trained for distinct types of image data (e.g., a detector of identity documents, a detector of medical records, a detector of financial records, etc.). In some instances, the image data 208 is a subset of the total image data monitored by the pipeline 201 when previous detection models assign a sensitive or non-sensitive verdict to the originally monitored image data. The image data 208 comprises image data as well as indications to delineate sections of data corresponding to each document that was monitored by the DLP system 107.

The trained detector 105 receives the image data 208 and generates a vector of confidence values for each category it is trained to detect. For instance, for identity documents, the categories can comprise passports, identification cards, etc. for various countries. The categories further comprise an "other" or "non-sensitive" category. In this instance, the "non-sensitive" category simply denotes that a document does not comprise the type of document the trained detector 105 is trained to detect for potentially sensitive data. The trained detector 105 assigns a category to each document corresponding to the image data 208, with each category assignment corresponding to the highest confidence value in the vector of confidence values. If each entry of the vector of confidence values is below a threshold value (e.g., 0.8 when the confidence values are in [0,1]), the trained detector 105 can assign a category that indicates low confidence of detection and corresponds to sensitive data. The trained detection model then communicates non-sensitive or other image data 212 to the pipeline 201 for further analysis and identity document image data 210 to a corrective action DLP module 203. The non-sensitive or other image data 212 and the identity document image data 210 comprise labels indicating categories detected for corresponding documents.

Example image data and category 214 comprises a rendering of image data for a passport with birthday "XXX", name "XXX", passport number, "XXX", other really sensitive data, and a depiction of a person's face. The depicted passport has a category of passport with confidence value 0.95 and subcategory of an American passport as detected by the trained detector 105. Per this example, the trained detector 105 can further delineate each category as both a category and subcategory. For instance the trained detector 105 can delineate the American passport as having a category of passport and a subcategory of American passport.

The corrective action module ("module") 203 receives the identity document image data 210 and identifies and performs corrective action thereof. For instance, the module 203 can determine a risk score associated with each document in the identity document image data 210 that can depend on the predicted category as well as the context in which the DLP system 107 monitored the document. Higher risk scores can be associated with documents monitored in sensitive locations, such firewalls monitoring a private network communicating with the Internet. The module 203 can generate an alert 216 that indicates the document, category, subcategory, confidence value, risk score, context where the document was monitored, etc. The module 203 can further perform corrective action such as temporarily throttling communication on a channel where the document was monitored, scanning a database where the document was stored, terminating processes running on an endpoint device related to the document, etc.

Figure 3:
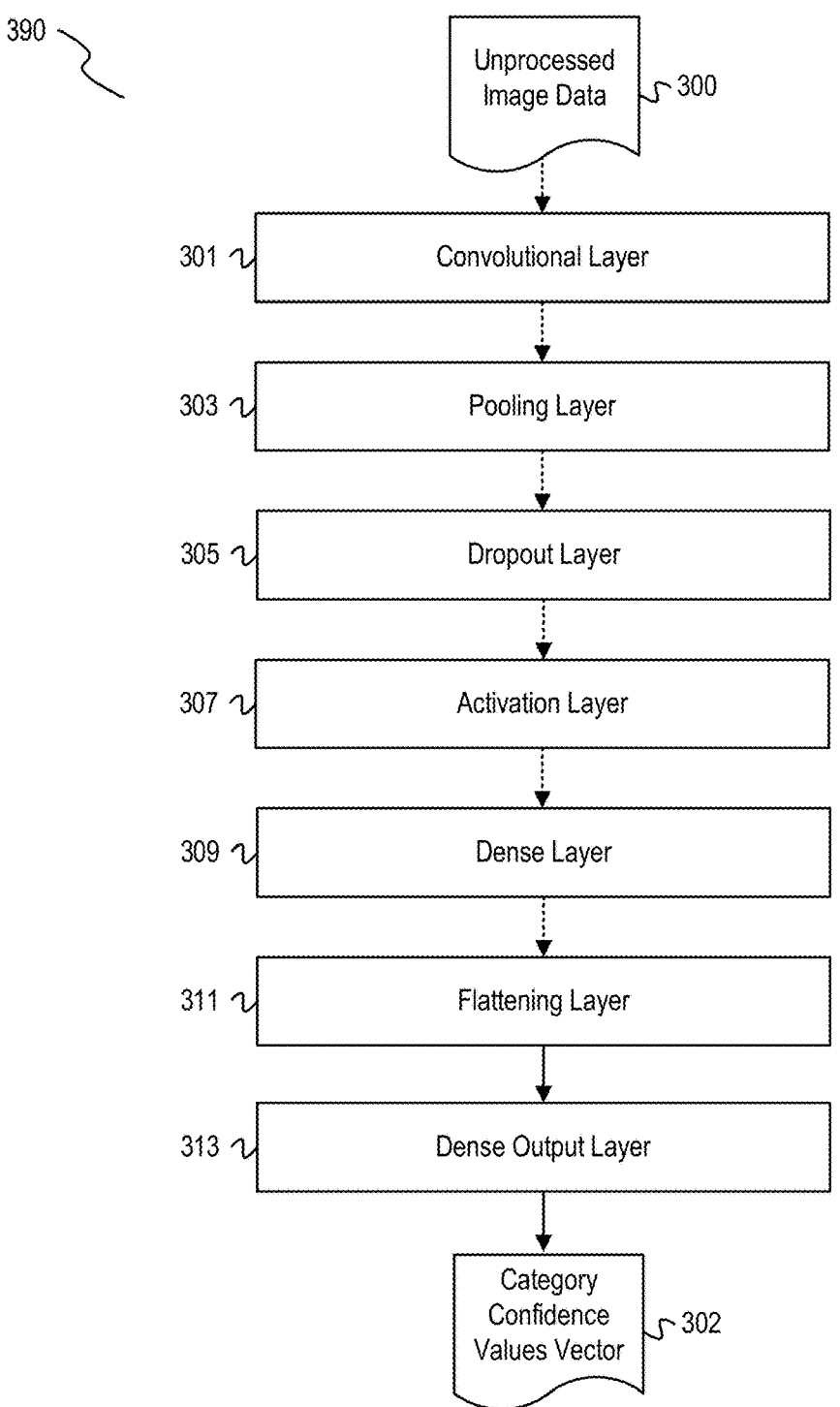
FIG. 3 is a schematic diagram of an example architecture for a two-dimensional CNN identity document detector.

FIG. 3 is a schematic diagram of an example architecture for a two-dimensional CNN identity document detector. An example two-dimensional CNN 390 comprises a convolutional layer 301, a pooling layer 303, a dropout layer 305, an activation layer 307, a dense layer 309, and a flattening layer 311 that are connected by dashed lines to indicate that each of these layers can occur multiple times with multiple numbers of internal parameters/nodes and in any order, and some layers can be omitted. One of the layers 301, 303, 305, 307, 309, and 311 receives unprocessed image data 300 for a document as input. A final flattening layer of the flattening layer 311 feeds into a dense output layer 313 that outputs a category confidence values vector 302 indicating confidence of each category for the document.

Figure 4:
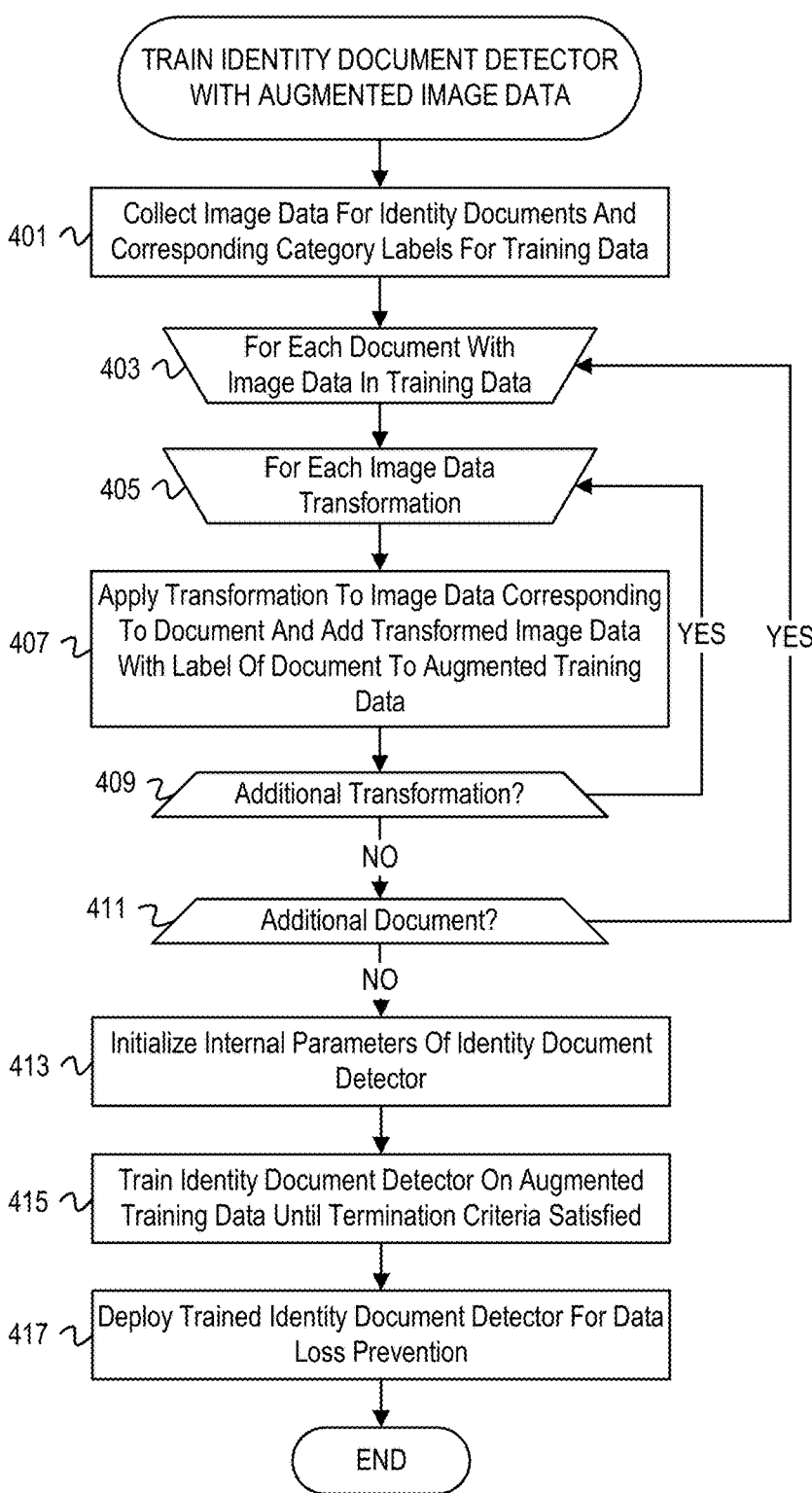
FIG. 4 is a flowchart of example operations for training and identity document detector with augmented image data.
Figure 5:
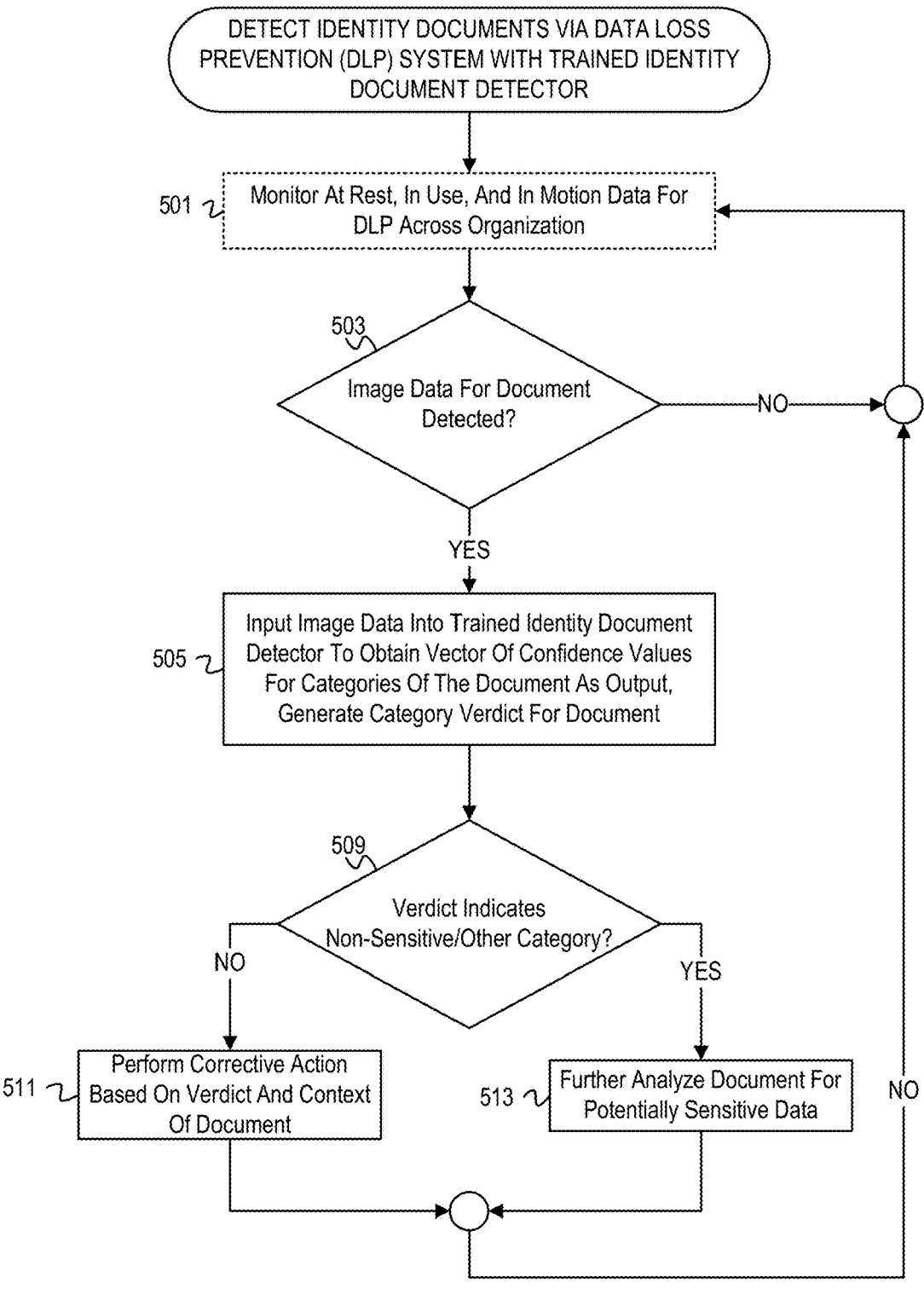
FIG. 5 is a flowchart of example operations for detecting identity documents via a DLP system with a trained identity document detector ("trained detector").

FIGS. 4-5 are flowcharts of example operations for training and deploying an identity document detector for detecting identity documents from image data in documents for DLP. The example operations are described with reference to an identity document detector ("detector"), trained identity document detector ("trained detector"), and a DLP system that includes the various databases, trainers, pipelines, and modules depicted in the foregoing for simplicity, consistency with the earlier figure(s), and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 4 is a flowchart of example operations for training an identity document detector with augmented image data. At block 401, a DLP system collects image data for identity documents and corresponding category labels for training data. The image data can comprise image data stored in a repository such as a public repository of example identity documents. The DLP system can further collect image data of an organization at which the detector will be deployed. Each category label indicates a type of identity document such as passport, green card, driver's license, check, credit card, form, etc. and can further indicate a country of origin and/or language for the identity document. Accordingly, documents can comprise documents with text in multiple languages corresponding to multiple geographic locations for various categories.

At block 403, the DLP system begins iterating through documents in the image data. The image data can comprise indicators to delineate sections of image data corresponding to each document in association with the category labels. At block 405, the DLP system begins iterating through image data transformations to apply.

At block 407, the DLP system applies the transformation at the current iteration to image data corresponding to the document at the current iteration and adds the transformed image data with a label of the document, which is the same label as the document pre-transformation, to augmented training data. Example transformations comprise contrast transformations, saturation transformations, brightness transformations, sharpness transformations, rotation transformations, noise transformations, skew transformations, white and black padding transformations, cropping transformations, etc. Transformation parameters can be chosen at random according to predefined distributions, for instance various noise transformations can apply noise to image data chosen according to a Gaussian distribution with mean zero and varying variances. Cropping can be chosen at a random side of the image with uniformly random length as a percentage of total length for a corresponding dimension (e.g., width/height) in image data.

At block 409, the DLP system determines whether there are additional transformations. If there is an additional transformation, operational flow returns to block 405. Otherwise, operational flow proceeds to block 411. At block 411, the DLP system determines whether there is an additional document present in the training data. If there is an additional document, operational flow returns to block 403. Otherwise, operational flow proceeds to block 413.

At block 413, the DLP system initializes internal parameters of an identity document detector ("detector"). Internal parameters of the detector vary with respect to model type and architecture. For instance, the detector can comprise a two-dimensional CNN with varying types and sizes of layers including convolutional layers, pooling layers, dense layers, flattening layers, activation layers, etc. In some instances, internal parameters of the detector are randomly initialized. Other image detection models can comprise different layer types and architectures, for instance recurrent neural network architectures. The number and size of internal layers of the detector can depend on the amount of augmented training data (i.e., larger and more internal layers for more augmented training data).

At block 415, the DLP system trains the detector on the augmented training data until one or more termination criteria are satisfied. For instance, for a neural network the DLP system can split the non-augmented data from the augmented training data into training/testing/validation data. The DLP system can then train the detector on batches of training data subsampled uniformly at random as a fixed percentage (e.g., 10%) across epochs comprising iterations through all of the training data until the termination criteria are satisfied. The termination criteria can comprise criteria that training, testing, and/or validation error are sufficiently low, that a threshold number of batches and/or epochs have elapsed, that internal parameters of the detector converge across iterations, etc. The termination criteria can be tuned to overfit/underfit the detector to the training data depending on context for which the detector is deployed. For instance, the detector can be overfit to the training data when the detector is deployed in a context where identity documents have very specific image features, whereas the detector can be underfit to the training data when the detector is deployed in a context where identity documents have very broad image features.

At block 417, the DLP system deploys the trained identity document detector ("trained detector") for DLP. The trained detector can be deployed in multiple instances, for instance in a cloud, on an agent monitoring endpoints/servers, etc. In some embodiments, the DLP system trains multiple instances of the trained detector with the augmented training data and with different training parameters that overfit/underfit the trained detector depending on various contexts for which it is deployed (e.g., an agent monitoring sensitive documents versus a firewall monitoring low-risk public network traffic).

The augmented training data described variously in FIG. 4 can comprise organization-specific training data as well as organization-agnostic training data, for instance training data obtained from public datasets. In some embodiments, the DLP system maintains organization-agnostic detectors and based on a prompt from an organization for a trained detector, further trains an organization-agnostic detector with augmented training data for the organization.

FIG. 5 is a flowchart of example operations for detecting identity documents via a DLP system with a trained identity document detector ("trained detector"). At block 501, the DLP system monitors at rest, in use, and in motion data for DLP across an organization. For instance, the DLP system can be deployed at agents running on endpoint devices and servers, at firewalls in the cloud, at central repositories that collect data across the organization, etc. DLP can occur inline, such as by using lightweight models on data parsed from traffic logs, or offline, such as by monitoring data collected at the central repositories according to a schedule such as every day. Block 501 is depicted with a dashed outline to indicate that the operations for DLP monitoring occur independently of the remaining operations in FIG. 5 and until an external trigger, e.g., an administrator of the organization, halts operational flow.

At block 503, the DLP system determines whether image data for a document has been detected. For instance, the DLP system can comprise functionality for detecting image data via file format information (e.g., file extensions) and/or other metadata (e.g., metadata from HyperText Transfer Protocol headers) that indicates sections of data correspond to an image. If the DLP system determines that image data for a document has been data, operational flow proceeds to block 505. Otherwise, operational flow returns to block 501.

At block 505, the DLP system inputs the image data into the trained detector to obtain a vector of confidence values for categories of the document as output and generates a category verdict for the document based on the vector of confidence values. For instance, the categories can comprise categories of identity documents such as passports from various countries, checks, credit cards, driver's licenses, green cards, and an "other" category. The image data can comprise text from multiple languages corresponding to multiple geographic locations for the identity document categories. The "other" category indicates that the document does not comprise any of the categories of identity documents the trained detector was trained to detect and, in some embodiments, further indicates that the document is non-sensitive. The DLP system can generate the category verdict as the category with highest confidence value in the vector of confidence values. In some embodiments, when each entry of the vector of confidence values is below a threshold confidence value, the DLP system can assign a low-confidence verdict that indicates that every category has low confidence of corresponding to the image data. This category corresponds to sensitive data in contrast to the "other" or "non-sensitive" categories.

At block 509, the DLP system determines whether the category verdict indicates a non-sensitive and/or other category. If a non-sensitive/other category is indicated, operational flow skips to block 513. Otherwise, operational flow proceeds to block 511.

At block 511, the DLP system performs corrective action based on the category verdict and context of the document. For instance, the DLP system can store a risk score that associates higher risk with higher risk document categories. To exemplify, the DLP system can store higher risk scores for document categories corresponding to geographical locations where an organization is not located. These risk scores can be configured by the organization. The DLP system further analyzes context to supplement the document category risk scores to increase risk for higher-risk contexts such as sensitive databases, private network communications, etc. The corrective action varies based on risk determined from category verdicts and context. For instance, when risk is low, corrective action can comprise a user alert to context where the document was detected and associated category verdict, as well as a user display indicating text extracted from the document using OCR or a rendering of the document. When risk is high, corrective action can comprise escalation to an administrator, automated throttling of communications in the context where the document was detected, etc. Operational flow returns to block 501 for continued monitoring for DLP.

At block 513, the DLP system further analyzes the document for potentially sensitive data. For instance, the DLP system can comprise further functionality for analyzing other aspects of the document, such as text extracted from the document via OCR. The DLP system can comprise additional trained detectors trained to detect other categories of documents (e.g., documents comprising financial and/or medical data) that further analyze the document. Operational flow returns to block 501.
Variations Identity document detectors as described herein as being trained and deployed to detect various categories of identity documents for DLP. This is chosen as an illustrative example of a set of document categories related to DLP. any of the identity document detectors herein can be alternatively trained and deployed for detection of other sets of document categories such as document categories related to financial data and medical data. Moreover, other types and architectures of image detection models can be implemented beyond CNNs such as a Residual Neural Network architecture.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in block 501 can be performed in parallel or concurrently with the remaining operations in FIG. 5. With respect to FIG. 4, augmenting training data for an identity document detector is not necessary when sufficient training data is obtained by the DLP system. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 6:
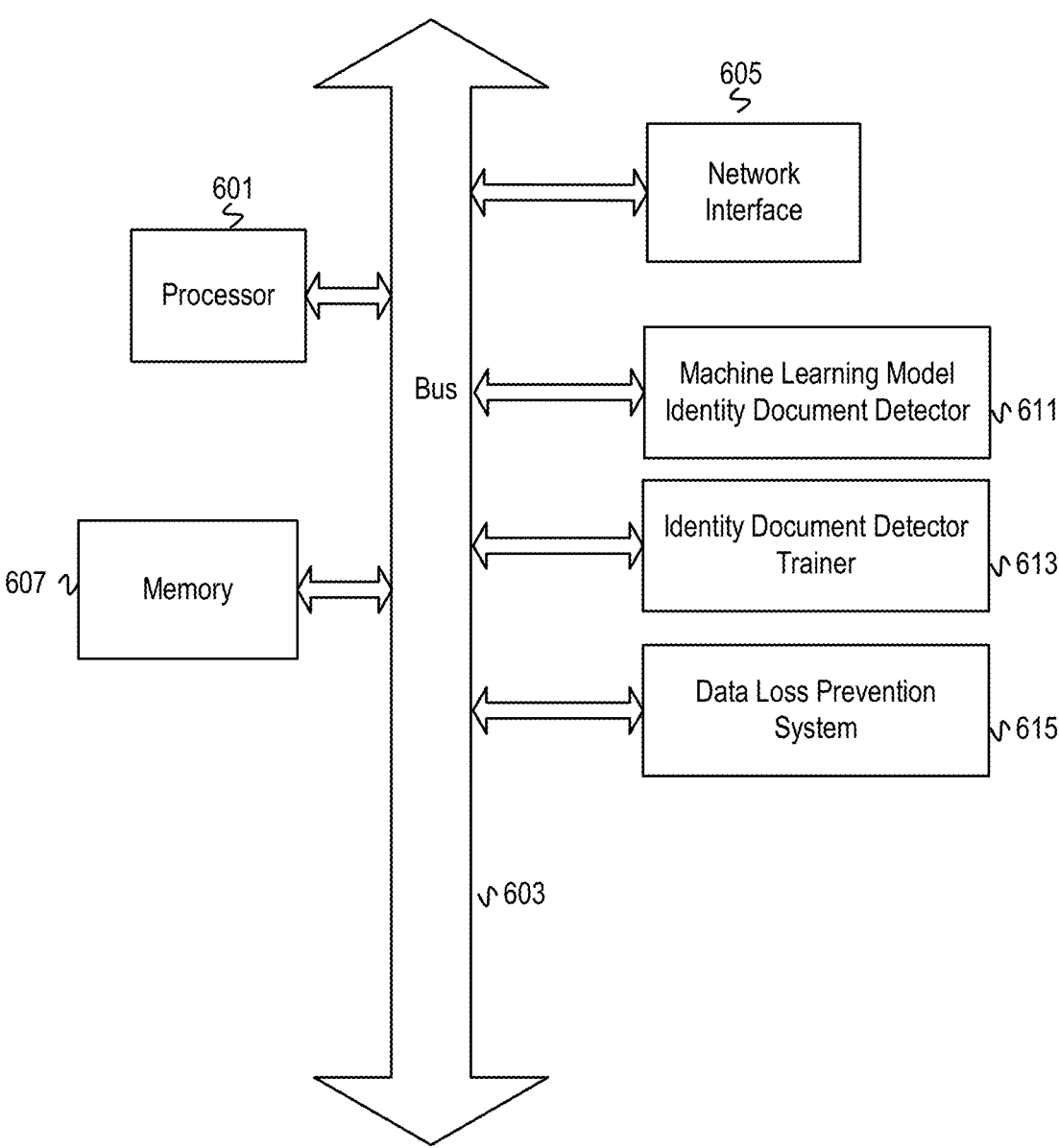
FIG. 6 depicts an example computer system with a machine learning model identity document detector, an identity document detector trainer, and a DLP system.

FIG. 6 depicts an example computer system with a machine learning model identity document detector, an identity document detector trainer, and a DLP system. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes a machine learning model identity document detector ("detector") 611 and an identity document detector trainer ("trainer") 613. The trainer 613 augments training data labelled with identity document categories using various data transformations to obtain augmented training data and then trains the detector 611 to detect the identity document categories for DLP. The detector 611 that has been trained is subsequently deployed in a DLP system 615 to detect documents having one of the identity document categories based on inputting unprocessed image data for documents detected in data monitored for DLP by the DLP system 615 across an organization. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

The invention claimed is:

1. A method comprising:

scanning data to detect one or more documents comprising image data;

inputting the image data from the one or more documents into a trained machine learning model to obtain, for each document in the one or more documents, a corresponding category of a plurality of categories, wherein the plurality of categories comprises categories of sensitive data or non-sensitive data, wherein the trained machine learning model was trained on augmented image data with labels for corresponding ones of the plurality of categories, and wherein the augmented image data comprises image data augmented with transformations comprising at least one of contrast transformations, saturation transformations, brightness transformations, sharpness transformations, rotation transformations, skew transformations, white padding transformations, black padding transformations, and cropping transformations; and indicating at least a subset of the one or more documents corresponding to categories of sensitive data in the plurality of categories for data loss prevention.

2. The method of claim 1, wherein the plurality of categories corresponding to sensitive data comprises one or more categories corresponding to types of identity documents.

3. The method of claim 2, wherein the types of identity documents comprise identity documents for a plurality of languages.

4. The method of claim 1, further comprising, applying optical character recognition to at least the subset of the one or more documents; and indicating text data obtained from applying the optical character recognition in a user display.

5. The method of claim 1, wherein the trained machine learning model comprises a trained convolutional neural network (CNN).

6. The method of claim 5, wherein the CNN is deployed inline to monitor network traffic.

7. The method of claim 5, wherein the CNN is deployed offline to monitor at rest data.

8. The method of claim 1, wherein scanning the data comprises, detecting the one or more documents in the data; and extracting image data from the one or more documents.

9. A non-transitory machine-readable medium having program code stored thereon, the program code comprising instructions to:

generate training data for a plurality of documents, wherein the training data comprises image data for each of the plurality of documents and labels for each of the plurality of documents indicating one of a plurality of categories, wherein the plurality of categories comprises categories of sensitive data or non-sensitive data, and wherein the instructions to generate the training data comprise instructions to augment the image data, wherein the augmented image data comprises image data augmented with transformations comprising at least one of contrast transformations, saturation transformations, brightness transformations, sharpness transformations, rotation transformations, skew transformations, white padding transformations, black padding transformations, and cropping transformations;

train a machine learning model on the training data to predict categories in the plurality of categories for image data of documents; and deploy the trained machine learning model for data loss prevention on image data for detected documents.

10. The machine-readable medium of claim 9, wherein the plurality of categories corresponding to sensitive data comprises one or more categories corresponding to types of identity documents.

11. The machine-readable medium of claim 10, wherein the types of identity documents comprise identity documents for a plurality of languages.

12. The machine-readable medium of claim 9, wherein the trained machine learning model comprises a trained convolutional neural network (CNN).

13. The machine-readable medium of claim 12, wherein the CNN is deployed inline and/or offline based on a corresponding context of the inline and/or offline deployment.

14. An apparatus comprising:

a processor; and a machine-readable medium having instructions stored thereon that are executable by the processor to cause the apparatus to, scan data to extract image data from one or more documents in the data;

input the image data from the one or more documents into a trained machine learning model to obtain, for each document in the one or more documents, a corresponding category in a plurality of categories, wherein the plurality of categories comprises categories of sensitive data or non-sensitive data, wherein the trained machine learning model was trained on augmented image data with labels for corresponding ones of the plurality of categories, and wherein the augmented image data comprises image data augmented with transformations comprising at least one of contrast transformations, saturation transformations, brightness transformations, sharpness transformations, rotation transformations, skew transformations, white padding transformations, black padding transformations, and cropping transformations; and indicate at least a subset of the one or more documents corresponding to categories of sensitive data in the plurality of categories for data loss prevention.

15. The apparatus of claim 14, wherein the plurality of categories corresponding to sensitive data comprises one or more categories corresponding to types of identity documents.

16. The apparatus of claim 15, wherein the types of identity documents comprise identity documents for a plurality of languages.

17. The apparatus of claim 14, the machine-readable medium further has stored thereon instructions executable by the processor to cause the apparatus to, apply optical character recognition to at least the subset of the one or more documents; and indicate text data obtained from applying the optical character recognition in a user display.

18. The apparatus of claim 14, wherein the trained machine learning model comprises a trained convolutional neural network (CNN).

19. The apparatus of claim 18, wherein the CNN is deployed inline to monitor network traffic.

20. The apparatus of claim 18, wherein the CNN is deployed offline to monitor at rest data.

\* \* \* \* \*